US012568376B2

(12) United States Patent
Soriano et al.

(10) Patent No.: US 12,568,376 B2
(45) Date of Patent: Mar. 3, 2026

(54) METHOD AND SYSTEM FOR AUTHENTICATING USERS

(71) Applicant: Konica Minolta Business Solutions U.S.A., Inc., Ramsey, NJ (US)

(72) Inventors: Randy Cruz Soriano, San Leandro, CA (US); Subramanyam Badri, Livermore, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 331 days.

(21) Appl. No.: 17/708,808

(22) Filed: Mar. 30, 2022

(65) Prior Publication Data

US 2023/0319576 A1      Oct. 5, 2023

(51) Int. Cl.
*H04W 12/64*          (2021.01)
*H04W 12/06*          (2021.01)
(52) U.S. Cl.
CPC ........... *H04W 12/64* (2021.01); *H04W 12/06* (2013.01)
(58) Field of Classification Search
CPC ..... H04W 12/64; H04W 12/06; H04W 4/023; H04W 4/026; H04W 12/63; G06F 21/35; G06F 2221/2111; H04L 63/083; H04L 63/0861; H04L 63/107
See application file for complete search history.

(56) References Cited

U.S. PATENT DOCUMENTS 6,615,182 B1      9/2003   Powers et al.
8,430,310 B1 *    4/2013   Ho ........................... G06F 21/35
                                                          235/382

9,201,953 B2      12/2015   Yang et al.
9,344,436 B1 *    5/2016    Sheng ................... H04W 12/08
9,514,293 B1      12/2016   Moritz et al.
10,681,024 B2     6/2020    Badri et al.
(Continued)

FOREIGN PATENT DOCUMENTS

JP       2019023859 A      2/2019
JP       2021192271 A *    12/2021    ............ B60W 30/14

OTHER PUBLICATIONS

The extended European Search Report issued on Sep. 5, 2023, by the European Patent Office in corresponding European Application No. 23165359.3. (9 pages).
(Continued)

*Primary Examiner* — Bassam A Noaman
(74) *Attorney, Agent, or Firm* — Buchanan Ingersoll & Rooney PC

(57)          ABSTRACT

A method, a system, and a non-transitory computer readable program code are disclosed for authenticating users. The method includes registering, on a processing device, one or more users in an authentication system, each of the one or more users having at least one corresponding client device; receiving, on the processing device, location data from the at least one corresponding client device; receiving, on the processing device, location data from one or more computer systems; calculating, on the processing device, a distance from the one or more computer systems to the at least one corresponding client device; receiving, by the processing device, an orientation or orientations of the at least one corresponding client device; and sending, by the processing device, a notification to the at least one corresponding client device.

19 Claims, 9 Drawing Sheets

(56) References Cited

U.S. PATENT DOCUMENTS

| 12,147,981 | B2 * | 11/2024 | Pickering ............. G06Q 20/206 |
| 2002/0169965 | A1 | 11/2002 | Hale et al. |
| 2004/0039909 | A1 | 2/2004 | Cheng |
| 2006/0021003 | A1 | 1/2006 | Fisher et al. |
| 2006/0102717 | A1 | 5/2006 | Wood et al. |
| 2011/0312311 | A1 * | 12/2011 | Abifaker ........... H04M 1/72415 |
| | | | 455/418 |
| 2015/0046711 | A1 | 2/2015 | Slaby et al. |
| 2016/0005050 | A1 | 1/2016 | Teman |
| 2017/0034183 | A1 | 2/2017 | Enqvist et al. |
| 2017/0230379 | A1 | 8/2017 | Morelli |
| 2018/0295128 | A1 | 10/2018 | Drake et al. |
| 2018/0351925 | A1 * | 12/2018 | Badri ................... H04L 63/105 |
| 2019/0043365 | A1 * | 2/2019 | McDavitt-Van Fleet .................... |
| | | | G08G 1/202 |
| 2020/0329037 | A1 * | 10/2020 | Beard ................ G07C 9/00571 |
| 2021/0006598 | A1 | 1/2021 | Nagao |
| 2021/0073362 | A1 * | 3/2021 | Alameh .................. G06F 21/44 |
| 2022/0283296 | A1 * | 9/2022 | Zhang ................. G01S 13/9029 |
| 2022/0301556 | A1 * | 9/2022 | Mese ................... H04W 12/06 |

OTHER PUBLICATIONS

Zhou et al., "Enhancing Mobile Content Privacy with Proxemics Aware Notifications and Protection", Human Factors In Computing Systems, ACM, May 7, 2016, pp. 1362-1023, XP058257320.

* cited by examiner

300

300

350 — calculate distance from mobile to target PC

360 — Is mobile device near to target PC

No

370 — Is orientation = front

No

380 — Send/Receive login notification

400

| Mobile Device | n location <=1m | orientation | notify |
|---|---|---|---|
| 1 | no | | no |
| 2 | yes | left | no |
| 3 | yes | right | no |
| 4 | yes | rear | no |
| 5 | yes | front | yes |

| PC | Mobile Device | n | location <=1m | orientation | notify |
|---|---|---|---|---|---|
| PC1 | | 1 | yes | front | yes |
| | | 2 | yes | right | no |
| | | 3 | yes | rear | no |

| PC | Mobile Device | n | location <=1m | orientation | notify |
|---|---|---|---|---|---|
| PC2 | | 1 | yes | right | no |
| | | 2 | no | | no |
| | | 3 | yes | left | no |

| PC | Mobile Device | n | location <=1m | orientation | notify |
|---|---|---|---|---|---|
| PC3 | | 1 | no | | no |
| | | 2 | no | | no |
| | | 3 | yes | rear | no |

| PC | Mobile Device | n | location <=1m | orientation | notify |
|---|---|---|---|---|---|
| PC4 | | 1 | no | | no |
| | | 2 | no | | no |
| | | 3 | no | | no |

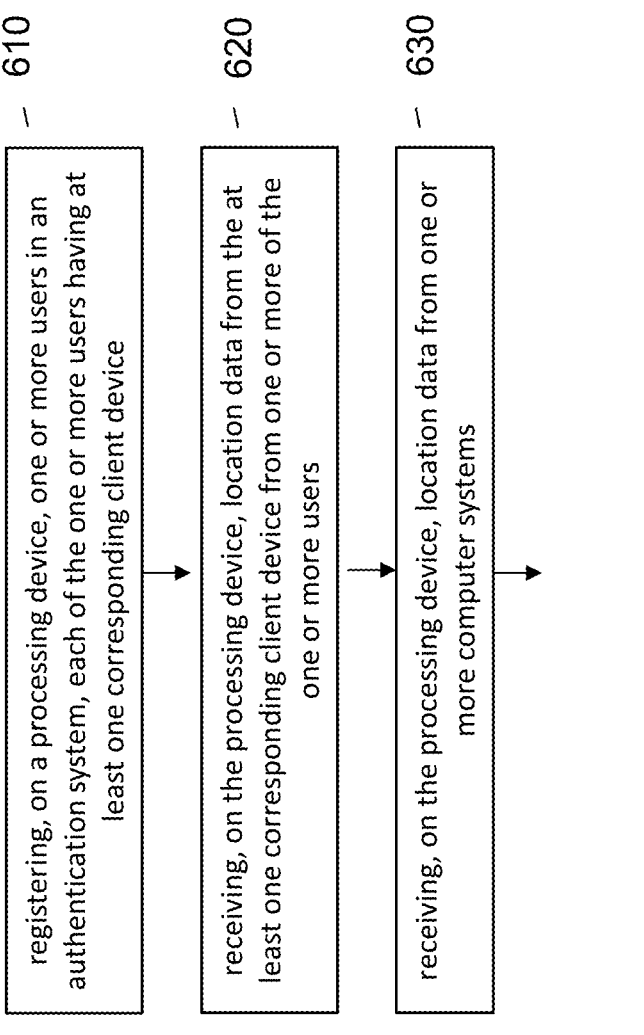

610 registering, on a processing device, one or more users in an authentication system, each of the one or more users having at least one corresponding client device

620 receiving, on the processing device, location data from the at least one corresponding client device from one or more of the one or more users

630 receiving, on the processing device, location data from one or more computer systems

FIG. 6A

600

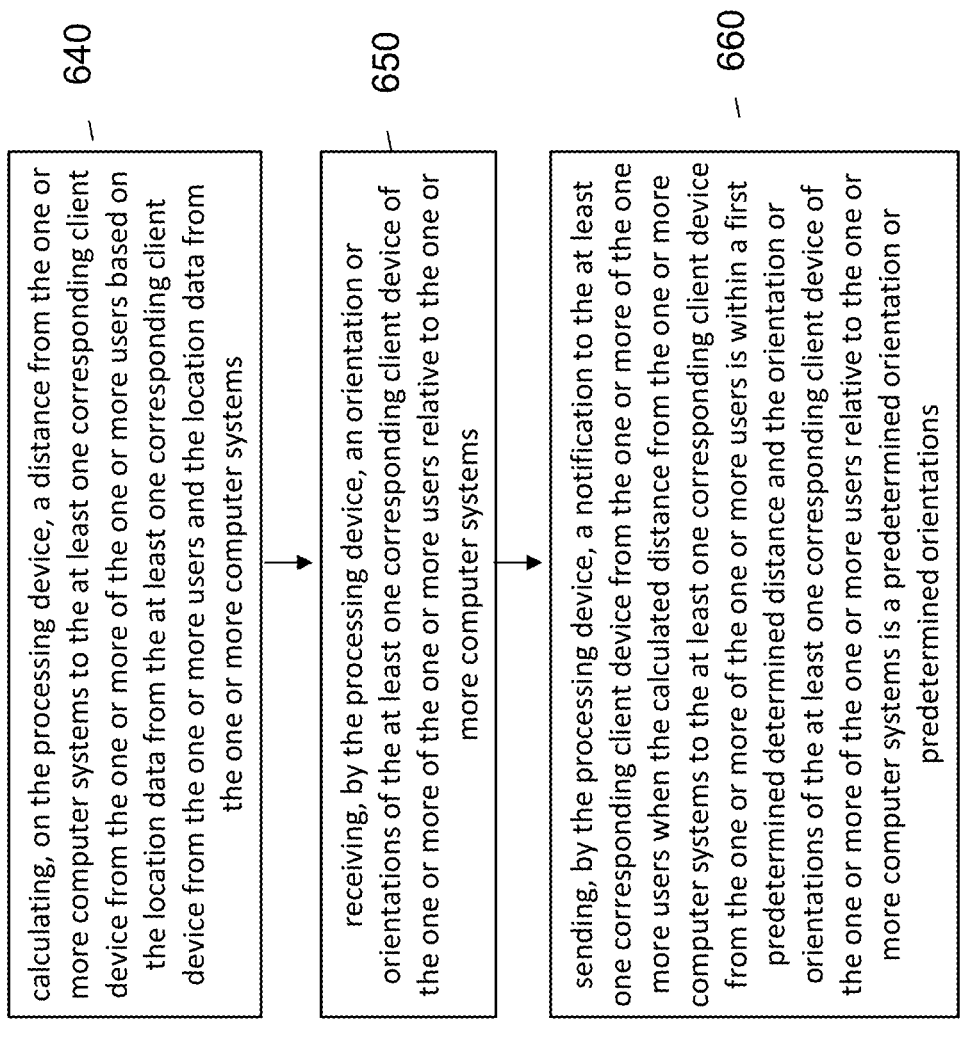

640 calculating, on the processing device, a distance from the one or more computer systems to the at least one corresponding client device from the one or more of the one or more users based on the location data from the at least one corresponding client device from the one or more users and the location data from the one or more computer systems

650 receiving, by the processing device, an orientation or orientations of the at least one corresponding client device of the one or more of the one or more users relative to the one or more computer systems

660 sending, by the processing device, a notification to the at least one corresponding client device from the one or more of the one or more users when the calculated distance from the one or more computer systems to the at least one corresponding client device from the one or more of the one or more users is within a first predetermined determined distance and the orientation or orientations of the at least one corresponding client device of the one or more of the one or more users relative to the one or more computer systems is a predetermined orientation or predetermined orientations

FIG. 6B

METHOD AND SYSTEM FOR AUTHENTICATING USERS

FIELD

The present disclosure relates to a method and system for authenticating users, and more particularly, to a method and system for authenticating users and sending a notification to a corresponding client device when a calculated distance and orientation to a computer system is within a predetermined determined distance and predetermined orientation.

BACKGROUND

Current Information Technology (IT) environment utilize many techniques to authenticate a user, such as, for example, proximity cards, RFID cards, ID/Passwords, various biometric information, Smart cards, RSA tokens, and in some cases advanced methods like IRIS recognition, face detection, and voice recognition. The current methods may create a secure system but also has limitations, for example, for proximity detection of users and mobile devices for access to computer systems. In some systems, for example, registered users and mobile devices within a detected range are identified and each of the users and mobile devices may receive a notification requesting additional authentication for the user to access, for example, a computer system, which can send unnecessary information to the users and corresponding mobile devices of users whom have no intention of logging in or accessing a target computer system.

SUMMARY

Accordingly, there is need for a method and system that can effectively avoiding sending authentication requests to users and mobile devices that is common, for example, in an office environment, by discriminating between the computer system and one or more users and mobile devices that are within a detected range to identify users that are likely to access the computer system based on, for example, an orientation or orientations of the mobile device of the user.

In accordance with an embodiment, a method is disclosed for authenticating users, the method comprising: registering, on a processing device, one or more users in an authentication system, each of the one or more users having at least one corresponding client device; receiving, on the processing device, location data from the at least one corresponding client device from one or more of the one or more users; receiving, on the processing device, location data from one or more computer systems; calculating, on the processing device, a distance from the one or more computer systems to the at least one corresponding client device from the one or more of the one or more users based on the location data from the at least one corresponding client device from the one or more users and the location data from the one or more computer systems; receiving, by the processing device, an orientation or orientations of the at least one corresponding client device of the one or more of the one or more users relative to the one or more computer systems; and sending, by the processing device, a notification to the at least one corresponding client device from the one or more of the one more users when the calculated distance from the one or more computer systems to the at least one corresponding client device from the one or more of the one or more users is within a first predetermined determined distance and the orientation or orientations of the at least one corresponding client device of the one or more of the one or more users relative to the one or more computer systems is a predetermined orientation or predetermined orientations.

In accordance with an embodiment, a computer program product for authenticating users is disclosed, the computer program product comprising: a non-transitory computer-readable storage medium having program instructions embodied therewith, the program instructions executable by a computer to cause the computer to perform a method, comprising: registering one or more users in an authentication system, each of the one or more users having at least one corresponding client device; receiving location data from the at least one corresponding client device from one or more of the one or more users; receiving location data from one or more computer systems; calculating a distance from the one or more computer systems to the at least one corresponding client device from the one or more of the one or more users based on the location data from the at least one corresponding client device from the one or more users and the location data from the one or more computer systems; receiving an orientation or orientations of the at least one corresponding client device of the one or more of the one or more users relative to the one or more computer systems; and sending a notification to the at least one corresponding client device from the one or more of the one more users when the calculated distance from the one or more computer systems to the at least one corresponding client device from the one or more of the one or more users is within a first predetermined determined distance and the orientation or orientations of the at least one corresponding client device of the one or more of the one or more users relative to the one or more computer systems is a predetermined orientation or predetermined orientations.

In accordance with an embodiment, an authentication system configured to authentication users on a computer system is disclosed, the authentication system comprising: a server having a processor configured to: receive location data from at least one corresponding client device, the at least one corresponding client device being registered to a user in an authentication system; receive location data from one or more computer systems; calculate a distance from the one or more computer systems to the at least one corresponding client device of the user based on the location data from the at least one corresponding client device from user and the location data from the one or more computer systems; receive an orientation or orientations of the at least one corresponding client device of the user relative to the one or more computer systems; and send a notification to the at least one corresponding client device of the user when the calculated distance from the one or more computer systems to the at least one corresponding client device of the user is within a first predetermined determined distance and the orientation or orientations of the at least one corresponding client device of the user relative to the one or more computer systems is a predetermined orientation or predetermined orientations.

It is to be understood that both the foregoing general description and the following detailed description are exemplary and explanatory and are intended to provide further explanation of the invention as claimed.

BRIEF DESCRIPTION OF THE DRAWINGS

FIG. 4 is an illustration of an example of an authentication table for a plurality of mobile devices in accordance with an exemplary embodiment.

FIG. 5 is an illustrations of an example of authentication tables for a plurality of personal computers in accordance with an exemplary embodiment.

FIGS. 6A and 6B is an illustration of a method of authenticating users in accordance with an exemplary embodiment.

DESCRIPTION OF THE PREFERRED EMBODIMENTS

Figure 1:
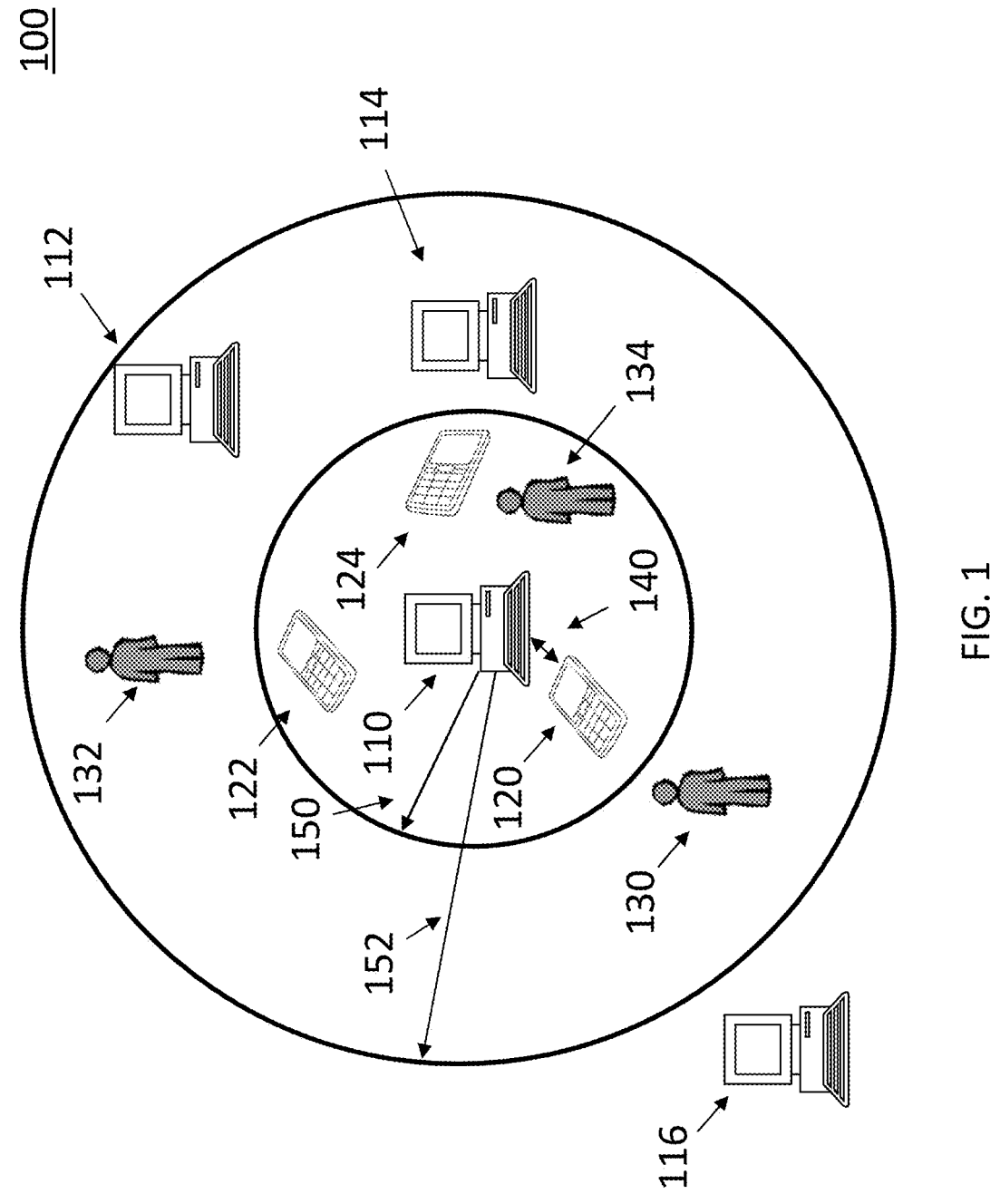
FIG. 1 is an illustration of a system for authenticating users in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for authenticating users 130, 132, 134 in accordance with an exemplary embodiment. The system 100 can include, for example, one or more computer systems 110, 112, 114, 116, one or more client devices 120, 122, 124, and one or more users 130, 132, 134. In accordance with an embodiment, each of the one or more users 130, 132, 134, will have at least one corresponding client device 120, 122, 124. The one or more computer systems 110, 112, 114, 116 can be, for example, a personal computer, a printer or a multifunction printer device (MFP), a home or office security system within a home or office, a server, and the like. In accordance with an exemplary embodiment, the one or more computer systems 110, 112, 114, 116 and the one or more client devices 120, 122, 124 can be, for example, equipped with a sensing device, for example, a real time locating system (RTLS), a Global Positioning System (GPS), a mobile phone tracking system, and/or Bluetooth that can be used to calculate relative distances between the one or more computer systems 110, 112, 114, 116 and the one or more client devices 120, 122, 124. For example, in accordance with an embodiment, the one or more the one or more computer systems 110, 112, 114, 116 and the one or more client devices 120, 122, 124, can include a system, for example, a sensing device and/or software application that automatically identifies and tracks the location of the one or more computer systems 110, 112, 114, 116 and the one or more client devices 120, 122, 124 in real time, for example, within a building or other contained area. For example, the system can include wireless real time locating system (RTLS) tags that are attached to objects and/or fixed reference point, which receive wireless signals from the real time locating system (RTLS) tags to determine the location of the one or more computer systems 110, 112, 114, 116 and the one or more client devices 120, 122, 124. In addition, the one or more client devices 120, 122, 124 can include, for example, an accelerometer for determining an orientation or orientations of the one or more client devices 120, 122, 124 relative to the one or more computer systems 110, 112, 114, 116. For example, the accelerometer can detect the orientation of the screen or display on the one or more client devices 120, 122, 124, for example, on a mobile device or smart phone. In accordance with an embodiment, the screen or display of the one or more client devices 120, 122, 124, can be facing upward with a top portion (i.e., side opposite the charge port and arranged in a manner in which a user 130, 132, 134, typically holds the mobile device or smart phone) of the screen or display facing towards the one or more computer systems 110, 112, 114, 116.

In accordance with an exemplary embodiment, each of the one or more client devices 120, 122, 124 includes at least one authentication application (or authentication module) for receiving an authenticator and/or biometric identifier, which can authenticate a user 130, 132, 134. In accordance with an embodiment, the authenticator, can be, for example, one or more of a password or passcode and biometric identifiers. In accordance with an exemplary embodiment, biometric identifiers can include distinctive, measurable characteristics used to label and describe or identify an individual, including a metric related to human characteristics. For example, biometric identifiers can include physiological characteristics of an individual including but not limited fingerprints, palm veins, face recognition, DNA (or deoxyribonucleic acid), palm print, hand geometry, iris recognition, retina, and/or odor/scent.

In accordance with an exemplary embodiment, once the user 130, 132, 134 has been authenticated, the user 130, 132, 134 may have access to the corresponding client device 120, 122, 124 of the user 130, 132, 134, and/or access to one or more of the computer systems 110, 112, 114, 116 as disclosed herein. The at least one authentication application can be configured to receive the authenticator(s) and/or biometric identifier(s), for example, via a keypad for a username and password ("password"), and/or a sensor, scanning device, or an electronic reader, which can read and/or obtain data from, for example, a proximity cards, a radio-frequency identification (RFID) card, smart cards, wearable devices, RSA tokens, and/or biometric identifiers. In accordance with an exemplary embodiment, each of the one or more computer systems 110, 112, 114, 116 and the one or more client devices 120, 122, 124 can be access by the user 130, 132, 134 via at least one authenticator and/or a biometric identifier, and preferably, at least two or more authenticators and/or biometric identifiers. For example, each of the one or more client devices 120, 122, 124 can include at least one authenticator or biometric identifier, which can be, for example, a keypad, a sensor, scanning device, or an electronic reader, for authenticating an authenticator and/or a biometric identifier as disclosed herein.

In accordance with an exemplary embodiment, the one or more computer systems 110, 112, 114, 116 and the one or more client devices 120, 122, 124, may be embodied by a smart phone, a smart tablet, a personal computer, a camera, a router, a medical device or apparatus, or a MFP (or printer), that can generate print data usable in a printer, a print server, or multi-function peripheral (MFP).

In accordance with an exemplary embodiment, each of the one or more computer systems 110, 112, 114, 116 and the one or more client devices 120, 122, 124 can include a processor or central processing unit (CPU), and one or more memories for storing software programs and data (such as files to be printed). The processor or CPU carries out the instructions of a computer program, which operates and/or controls at least a portion of the functionality of the devices the one or more computer systems 110, 112, 114, 116 and the one or more client devices 120, 122, 124. Each of the one or more computer systems 110, 112, 114, 116 and the one or more client devices 120, 122, 124 can also include an operating system (OS), which manages the computer hardware and provides common services for efficient execution of various software programs. For example, the software programs can include application software, for example, for managing an authentication module and/or biometric identifier, and/or printer driver software, for example, for the one or more client devices 120, 122, 124.

In accordance with an exemplary embodiment, the one or more computer systems 110, 112, 114, 116 can be a multi-function peripheral (MFP) or printer, which can be connected to the one or more client devices 120, 122, 124 via a communications network 140. In accordance with an exemplary embodiment, the multi-function peripheral (MFP) can include at least a copy function, an image reading function, a facsimile (fax) function, and a printer function, and forms an image on a sheet based on a print job (print instruction) received, from the one or more client devices 120, 122, 124.

In accordance with another exemplary embodiment, the one or more computer systems 110, 112, 114, 116 can be a medical device or a medical apparatus, which are used, for example, for diagnostic and/or therapeutic purposes. Examples of medical devices or medical apparatuses can include medical imaging devices, which can obtain, for example, radiological, angiographic, sonographic, and/or tomographic images. Alternatively, the one or more computer systems 110, 112, 114, 116 can be, for example, a back-end database, or enterprise database system, which can be accessed by the one or more users indirectly through an external application, for example, through the one or more client devices 120, 122, 124.

In accordance with an exemplary embodiment, the one or more computer systems 110, 112, 114, 116 can be incorporated into a home or office security system, which can include a method or system, which authenticates a user 130, 132, 134 for accessing the home or office, for example, via a door to the building, a floor or room of the home or office, via, for example, an elevator, and/or any other secured room. In addition, the method and systems as disclosed herein can be used in securing device, for example, security systems, and computers, within the user's home or office.

In accordance with an embodiment, the one or more computer systems 110, 112, 114, 116 and the one or more client devices 120, 122, 124 are connected via a communication network 140. The communication network 140 may include, for example, a conventional type network, wired or wireless, and may have any number of configurations, such as a star configuration, token ring configuration, or other known configurations. The communication network 140 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

Figure 2:
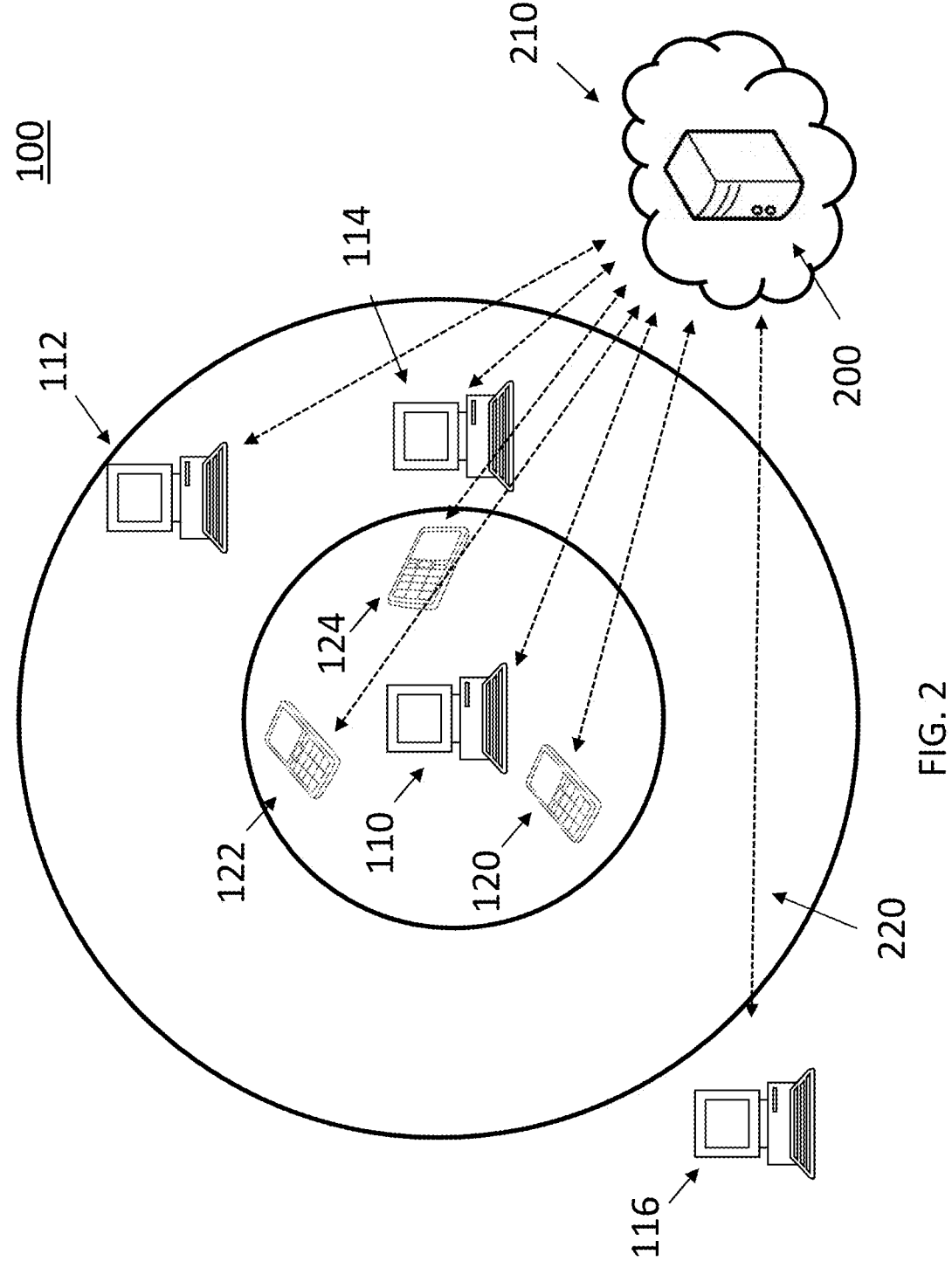
FIG. 2 is another illustration of a system for authentication users in accordance with an exemplary embodiment.

FIG. 2 is another illustration of a system 100 for authentication users 130, 132, 134 in accordance with an exemplary embodiment. As shown in FIG. 2, each of the one or more computer systems 110, 112, 114, 116 and the one or more client devices 120, 122, 124 are connected to one or more servers 200, for example, a cloud server 210 via a network connection 220. The one or more one servers 200 can be configured to interact with the one or more computer systems 110, 112, 114, 116, and the one or more client devices 120, 122, 124 as disclosed herein. The communication network 220 may include, for example, a conventional type network, wired or wireless, and may have any number of configurations, such as a star configuration, token ring configuration, or other known configurations. The communication network 220 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

In accordance with an exemplary embodiment, data may be transmitted in encrypted or unencrypted form between the one or more computer systems 110, 112, 114, 116, the one or more client devices 120, 122, 124, and the one or more servers 200 using a variety of different communication protocols including, for example, various Internet layer, transport layer, or application layer protocols. For example, data may be transmitted via the network 220 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 3A:
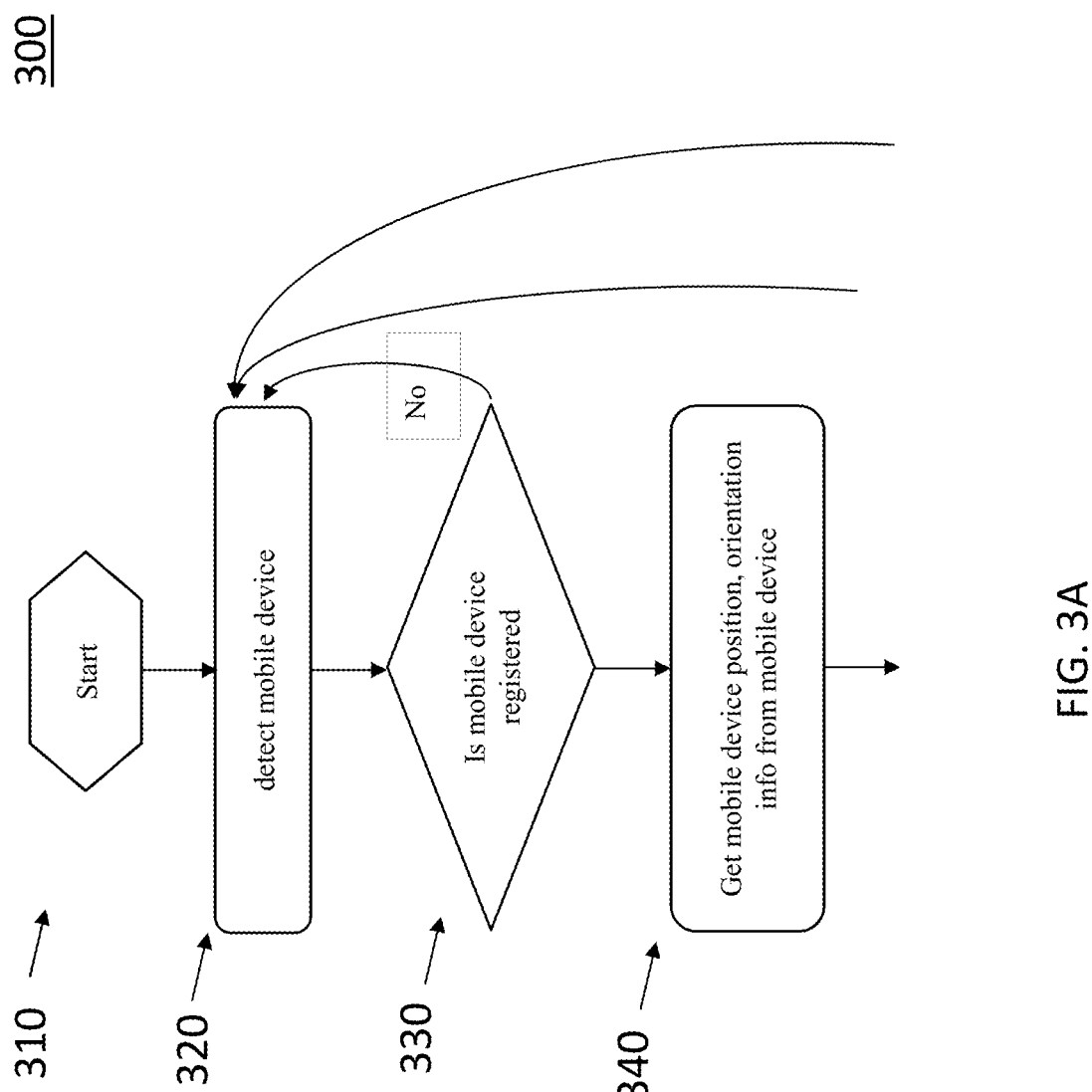
FIGS. 3A and 3B is a flowchart illustrating a method of authenticating users in accordance with an exemplary embodiment.
Figure 3B:
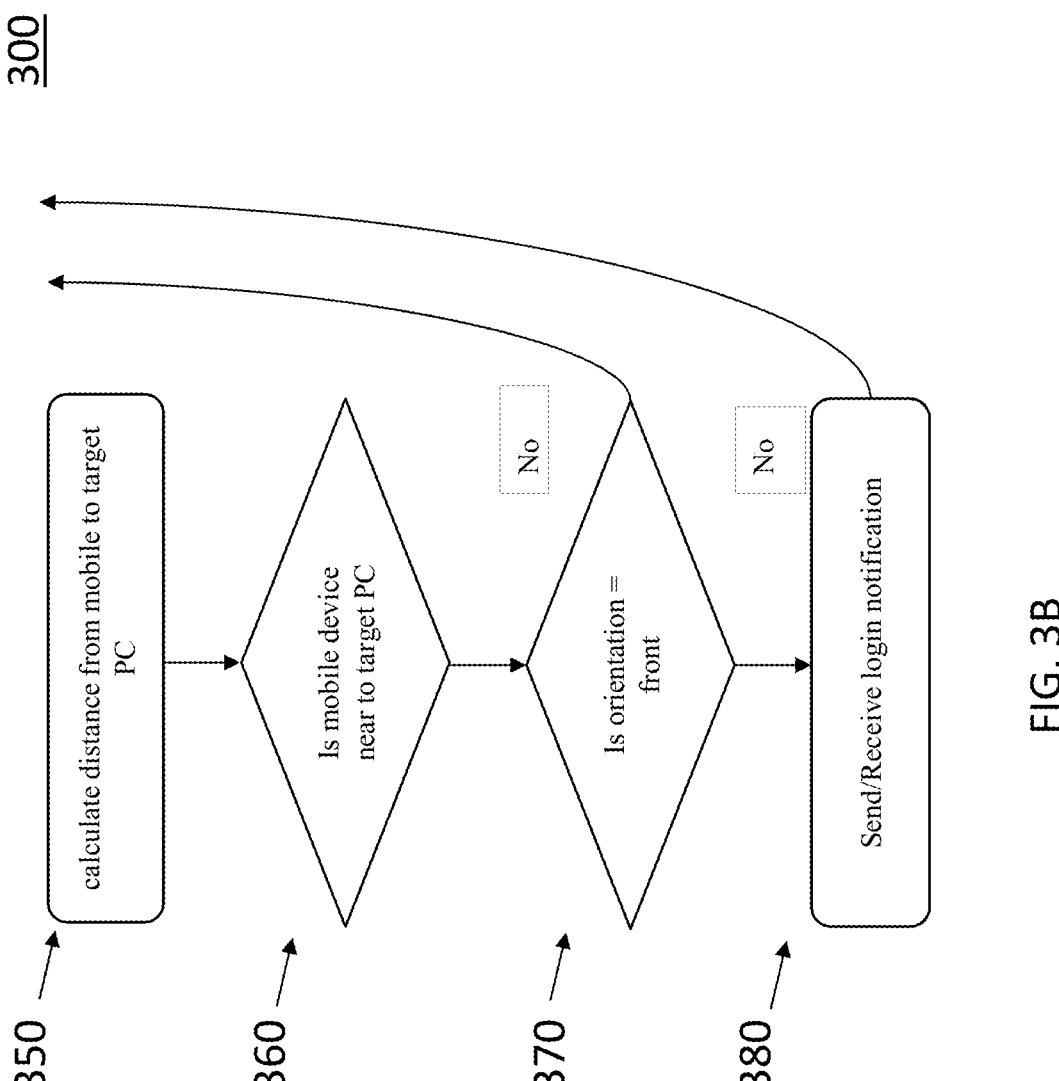

FIGS. 3A and 3B is a flowchart illustrating a method 300 of authenticating users in accordance with an exemplary embodiment. As shown in FIG. 3A, the process starts in step 310. In step 320, a processing device, for example, the one or more servers 200, for example, the cloud server 210 can receive location data (or location) information from the one or more client devices 120, 122, 124 that are within a first calculated distance (or first detected range) 150 (FIG. 1) and/or to a second calculated distance (or second detected range) 152 (FIG. 1) to one or more of the computer systems 110, 112, 114, 116. For example, the first calculated distance 150 can be 1 meter to 5 meters, for example, one (1) meter, and the second calculated distance 152 can be 5 meters to 100 meters, for example, 10 meters. In step 330, the cloud server 210 determines if the one or more client devices 120, 122, 124 are registered client devices to one or more of the users 130, 132, 134. If the one or more client devices 120, 122, 124 are not registered client devices 120, 122, 124, to one or more of the users 130, 132, 134, the process returns to step 320. If the one or more client devices 120, 122, 124 are registered to one or more of the users 130, 132, 134, the process continues to step 340 in which the position of the one or more client devices 120, 122, 124 is obtained in combination with an orientation of the one or more client devices 120, 122, 124 relative to the one or more computer systems 110, 112, 114, 116. In step 350, a distance from the one or more client devices 120, 122, 124 of the one or more users 130, 132, 134 to one or more of the one or more computer systems 110, 112, 114, 116 is calculated. In step 360 based on the calculated distance from the one or more client devices 120, 122, 124 to the one or more computer systems 110, 112, 114, 116, a determination can be made if the one or more client devices 120, 122, 124 of the one or more users 130, 132, 134, are within a predetermined distance, for example, with the first predetermined distance 150 and/or the second predetermined distance 152 to the one or more computer systems 110, 112, 114, 116. In step 360, if the one or more computer systems 110, 112, 114, 116 and the one or more client devices 120, 122, 124 are not within a predetermined distance, for example, the first predetermined distance 150 and/or the second predetermined distance 152 of the one or more computer systems 110, 112,

114, 116, the process returns to step 320. However, if the one or more clients 120, 122, 124 of the one or more users 130, 132, 134, are within the first predetermined distance 150 and/or the second predetermined distance 152 of the one or more computer systems 110, 112, 114, 116, the process continues to step 370 in which an orientation and/or orientations and movement of the one or more client devices 120, 122, 124 of the one or more users 130, 132, 134 relative to the one or more computer systems 110, 112, 114, 116, can be obtained. Once the orientation or orientations of the one or more client devices 120, 122, 124 of the one or more users 130, 132, 134 is obtained, the process continues to step 380 in which the one or more client devices 120, 122, 124 receives a notification, for example, login information from the processing server, for example, the one or more servers 200 such that the one or more users 130, 132, 134 with the corresponding client devices 120, 122, 124 can login and/or have access to the one or more computer systems 110, 112, 114, 116. Alternatively, the one or more clients 120, 122, 124 may be within the first predetermined distance 150 and/or the second predetermined distance 152 of the one or more computer systems 110, 112, 114, 116 and when the orientation and/or orientations and movement of the one or more client devices 120, 122, 124 relative to the one or more computer systems 110, 112, 114, 116 does not match an intent to be authenticated on the one or more computer systems 110, 112, 114, 116, the process returns to step 320.

FIG. 4 is an illustration of an example of an authentication table 400 for a plurality of mobile devices in accordance with an exemplary embodiment. In accordance with an embodiment, the one or more clients 120, 122, 124 can be a mobile device, for example, a smart phone or smart tablet. As shown in FIG. 4, the one or more servers 210 can receive information from the one or more clients 120, 122, 124, for example, mobile devices 1-5 that can include location of the one or more clients 120, 122, 124, such that a determination as set forth in step 350 of FIG. 3B can be made that the one or more clients 120, 122, 124 are within the predetermined distance 150, for example, less than one (1) meter. In addition, the one or more servers 200 can receive information from the one or more clients 120, 122, 124, for example, mobile devices 1-5 on an orientation or orientations of the one or more clients 120, 122, 124, for example, mobile devices 1-5. In accordance with an embodiment, the orientation or orientations of the one or more client devices 120, 122, 124, for example, of the front or top of the one or more clients 120, 122, 124, for example, mobile devices 1-5 relative to the one or more computer systems 110, 112, 114, 116. For example, the orientation detected can be no orientation, front of mobile device pointing to the left of the one or more computer systems 110, 112, 114, 116, pointing to the right of the one or more computer systems 110, 112, 114, 116, pointing rearward (i.e., rear) of the one or more computer systems 110, 112, 114, 116, and pointing forward (i.e., toward or at) the one or more computer systems 110, 112, 114, 116. In accordance with an embodiment, for each of the one or more clients 120, 122, 124 in which the front of the client is pointing toward the one or more computer systems 110, 112, 114, 116 will receive a notification. For example, the notification, can be request to enter a password or passcode or biometric identifier such that the user 120, 122, 124 may have access to the one or more computer systems 110, 112, 114, 116.

FIG. 5 is an illustrations of an example of authentication tables 500 for a plurality of computer systems 110, 112, 114, 116, for example, personal computers in accordance with an exemplary embodiment. As shown in FIG. 5, the one or more servers 200 can also receive information from the one or more computer systems 110, 112, 114, 116, for example, personal computers, such that a determination as set forth in step 350 of FIGS. 3A and 3B can be made. In addition, the one or more servers 200 can receive information from the one or more computer systems 110, 112, 114, 116 on an orientation of the one or more clients 120, 122, 124, for example, mobile devices 1-5. In accordance with an embodiment, the orientation, for example, the one or more clients 120, 122, 124, for example, mobile devices 1-5 relative to the one or more computer systems 110, 112, 114, 116 can be detected from the one or more clients 120, 122, 124. For example, the orientation detected can be no orientation, front of mobile device pointing to the left of the one or more computer systems 110, 112, 114, 116, pointing to the right of the one or more computer systems 110, 112, 114, 116, pointing rearward (i.e., rear) of the one or more computer systems 110, 112, 114, 116, and pointing forward (i.e., toward or at) the one or more computer systems 110, 112, 114, 116. In accordance with an embodiment, for each of the one or more clients 120, 122, 124 in which the front of the client is pointing toward the one or more computer systems 110, 112, 114, 116 will receive a notification. For example, the notification, can be request to enter a password or passcode or biometric identifier such that the user 120, 122, 124 may have access to the one or more computer systems 110, 112, 114, 116.

In accordance with an exemplary embodiment, the system 200 can use advanced machine learning, artificial intelligence and data analytic methods to process and analyze the captured user activity to train itself or perform incremental analysis for defining new authentication requirements, changes in level of authentication, and/or deciding or calculating a new score index of each of the one or more users.

In accordance with an exemplary embodiment, for example, the learning process of the system 200 can consider several factors to determine the incremental authentication requirements and learn the usage or login requirements of the one or more users 130, 132, 134 for one or more the computer systems 110, 112, 114, 116 and corresponding one or more client devices 120, 122, 124. In accordance with an exemplary embodiment, the machine-learning, artificial intelligence (AI) and data analytic methods or mechanism can include, but are not limited to, vector analysis, relationship mapping, clustering, anomaly detection, data visualization, regression analysis, neural networks, probabilistic methods etc.

FIGS. 6A and 6B is an illustration of a method of authenticating users in accordance with an exemplary embodiment. As shown in FIGS. 6A and 6B, in step 610, on a processing device, for example, one or more servers 200, one or more users 130, 132, 134 are registered in an authentication system. Each of the one or more users 130, 132, 134 having at least one corresponding client device 120, 122, 124. In step 620, on the processing device, location data from the at least one corresponding client device 120, 122, 124 from one or more of the one or more users 130, 132, 134 is received on the processing device. In step 630, location data from one or more computer systems 110, 112, 114, 116 is received on the processing device. In step 640, a distance from the one or more computer systems 110, 112, 114, 116 to the at least one corresponding client device 120, 122, 124 from the one or more of the one or more users 130, 132, 134 based on the location data from the at least one corresponding client device 120, 122, 124 from the one or more users 130, 132, 134 and the location data from the one or more computer systems 110, 112, 114, 116 is calculated on the processing device. In step 650, an orientation or orientations of the at least one corresponding client device 120, 122, 124 of the one or more of the one or more users 130, 132, 134 relative to the one or more computer systems 110, 112, 114, 116 is received by the processing device. In step 660, a notification is sent by the processing device to the at least one corresponding client device 120, 122, 124 from the one or more of the one more users when the calculated distance from the one or more computer systems 110, 112, 114, 116 to the at least one corresponding client device 120, 122, 124 from the one or more of the one or more users 130, 132, 134 is within a first predetermined determined distance and the orientation or orientations of the at least one corresponding client device 120, 122, 124 of the one or more of the one or more users 130, 132, 134 relative to the one or more computer systems 110, 112, 114, 116 is a predetermined orientation or predetermined orientations.

In accordance with an embodiment, the method can further include receiving, on the processing device, the location data from the at least one corresponding client device 120, 122, 124 from the one or more of the one or more users 130, 132, 134 when the at least one corresponding client device 120, 122, 124 of the one or more of the one or more users 130, 132, 134 is within a second predetermined distance of the one or more computer systems 110, 112, 114, 116. In addition, the one or more users 130, 132, 134 can include a plurality of users, and the method further includes identifying, by the processing device, a user from the plurality of users based on the calculated distance from the one or more computer systems 110, 112, 114, 116 to the at least one corresponding client device 120, 122, 124 of the one or more of the one or more users 130, 132, 134 and the orientation or orientations of the at least one corresponding client device 120, 122, 124 of the one or more of the one or more users 130, 132, 134 relative to the one or more computer systems 110, 112, 114, 116, and sending, by the processing device, the notification to the at least one corresponding client device 120, 122, 124 of the one or more of the one or more users 130, 132, 134 of the identified user of the plurality of users.

In accordance with an embodiment, the one or more computers systems can include a plurality of computer systems, and the method further includes identifying, by the processing device, one of the one or more users 130, 132, 134 from the plurality of users based on the calculated distance from the plurality of computer systems to the at least one corresponding client device 120, 122, 124 of the one or more of the one or more users 130, 132, 134 and the orientation or orientations of the at least one corresponding client device 120, 122, 124 of the one or more of the one or more users 130, 132, 134 relative to the one or more computer systems 110, 112, 114, 116, and sending, by the processing device, the notification to the at least one corresponding client device 120, 122, 124 of the one or more of the one or more users 130, 132, 134, the notification being a request for the one of the one or more users 130, 132, 134 to provide an authenticator for access to one of the plurality of computer systems.

In accordance with an embodiment, the notification is a request to the at least one corresponding client device 120, 122, 124 from the one or more of the one more users to provide an authenticator for access to the one or more computer systems 110, 112, 114, 116. In addition, the at least one corresponding client device 120, 122, 124 can be a smartphone or a mobile device.

In accordance with an embodiment, the method further includes assigning, by the processing device, an index score to each of the one or more users 130, 132, 134 for the one or more computer systems 110, 112, 114, 116, the index score corresponding to a historical use of the one more computer systems by the one or more users 130, 132, 134, and sending, by the processing device, the notification to the at least one corresponding client device 120, 122, 124 from the one or more of the one more users when the index score is above a predetermined threshold value. In accordance with an embodiment, the processing device can update the index score for each of the one or more users 130, 132, 134 based on login information into the one or more computer systems 110, 112, 114, 116 by the one or more users 130, 132, 134. For example, the processing device 220 can generate the score index for each of the one or more users 130, 132, 134, which can be continuously updated through a self-learning process, for example, a machine learning process (or algorithm) or artificial intelligence application based on the user activities. In addition, a default index score can be assigned to the one or more users 130, 132, 134. For example, the default score index can reflect a likelihood that the one or more users 130, 132, 134 will access the one or more computer systems 110, 112, 114, 116 based on previous usage, for example, of other computer systems 110, 112, 114, 116, within a network. For example, the default score index can be based on one or more of the type of computer system and resources available to the one or more users 110, 112, 114, 116, and credentials of the one or more users 110, 112, 114, 116, for example, position or title within a company and/or business.

In accordance with an embodiment, the method can further include determining, by the processing device, the orientation or orientations of the at least one corresponding client device 120, 122, 124 from the one or more of the one or more users 130, 132, 134 relative to a display on the one or more computer systems 110, 112, 114, 116. In addition, the notification can be sent by the processing device based on the calculated distance from the one or more computer systems 110, 112, 114, 116 to the at least one corresponding client device 120, 122, 124 from the one or more of the one or more users 130, 132, 134 and the orientation or orientations of the at least one corresponding client device 120, 122, 124 from the one or more of the one or more users 130, 132, 134 relative to the display on the one or more computer systems 110, 112, 114, 116 one or more computer systems 110, 112, 114, 116.

In accordance with an embodiment, the method can further include receiving, by a processing device of the one or more computer systems 110, 112, 114, 116, at least one authenticator or biometric from the corresponding client device 120, 122, 124 of the one or more of the one or more users 130, 132, 134 receiving the notification from the processing device, and granting, by the processing device of the one or more computer systems 110, 112, 114, 116, access to the one or more users 130, 132, 134 receiving the notification to the one or more computer systems 110, 112, 114, 116 when the at least one authenticator or biometric identifier provides a credential or matches a stored authenticator or biometric identifier for the one or more users 130, 132, 134. In addition, the processing device of the one or more computers systems can receive a biometric identifier from a biometric authentication device, the biometric authentication device including one or more of a sensor, a scanning device, or an electronic reader. For example, the biometric identifier can be at least one physiological characteristic of the one or more users 130, 132, 134, and wherein the at least one physiological characteristic is selected from one or more of fingerprints, palm veins, face recognition, DNA (deoxyribonucleic acid), palm print, hand geometry, iris recognition, retina, and/or odor/scent. In addition, the method can further include an authenticator of the one or more authenticators or biometric identifiers being one or more of a keypad for a username and password, a sensor, scanning device, or an electronic reader, which can read and/or obtain data from one or more of a proximity cards, a radio-frequency identification (RFID) card, smart cards, and RSA tokens.

In accordance with an embodiment, the access to the one or more computer system can include accessing a home or office, accessing a personal computer, a multi-function printer, or a host device, and accessing a database on the client device or the host device. For example, once the client device 120, 122, 124 receives a notification from the processing device, the biometrics of each of the one or more users 130, 132, 134 can be obtained on the corresponding client device 120, 122, 124, in which access will be granted, or alternatively, the biometrics can be transferred to or accessed by one or more of the one or more computer systems 110, 112, 114, 116, in which the user is attempting to access. For example, the authentication requirements for each of the one or more users 130, 132, 134 can be, for example, obtaining access to a home, a building, or an office, and/or unlocking access to, or accessing devices, systems, or applications, which can include, for example, software applications, databases or database management systems, and/or machines, for example, medical equipment, x-ray machines, and scanners. In addition, for example, for accessing an office or building, the biometric authentication requirements can requires multi-level authentication, for example, two or more authenticators and/or biometric identifiers, and for accessing the server room can also require multi-level authentication, for example two or more authenticators and/or biometric identifiers, which can be the same and/or different than the two or more authenticator and/or biometric identifiers required to access the office or building.

Figure 7:
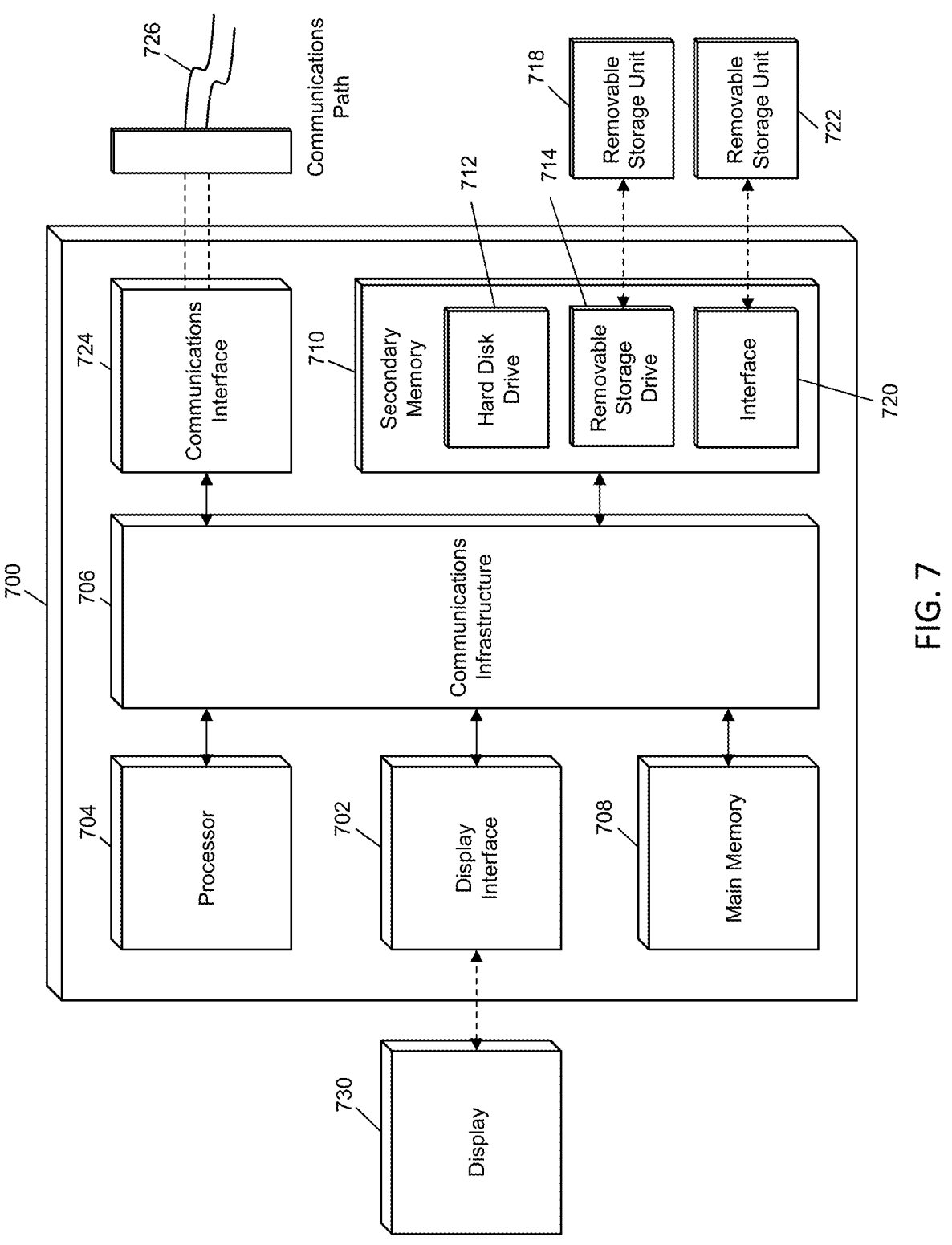
FIG. 7 is an illustration of an exemplary hardware architecture for an embodiment of a computer system.

FIG. 7 illustrates a representative computer system 700 in which embodiments of the present disclosure, or portions thereof, may be implemented as computer-readable code executed on hardware. For example, the one or more computer systems 110, 112, 114, 116 and the one or more client devices 120, 122, 124 associated with the method and system for authenticating users as disclosed herein may be implemented in whole or in part by a computer system 700 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this representative computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 704 may be processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 1-6B, as discussed herein. Accordingly, such computer programs may represent controllers of the computer system 700. Where the present disclosure is implemented using software executed on hardware, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software executed on hardware, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, method and system for authenticating users. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authenticating users, the method comprising:

registering, on a processing device, one or more users in an authentication system, each of the one or more users having at least one corresponding handheld client device;

receiving, on the processing device, location data from the at least one corresponding handheld client device from one or more of the one or more users;

receiving, on the processing device, location data from one or more computer systems;

calculating, on the processing device, a distance from the one or more computer systems to the at least one corresponding handheld client device from the one or more of the one or more users based on the location data from the at least one corresponding handheld client device from the one or more users and the location data from a display on the one or more computer systems;

receiving, by the processing device, an orientation or orientations of the at least one corresponding handheld client device of the one or more of the one or more users relative to the one or more computer systems;

determining, by the processing device, the orientation or orientations of the at least one corresponding handheld client device from the one or more of the one or more users relative to the display on the one or more computer systems;

sending, by the processing device, a notification request to the at least one corresponding handheld client device from the one or more of the one more users only when the calculated distance from the display on the one or more computer systems to the at least one corresponding handheld client device from the one or more of the one or more users is within a first predetermined distance and when the orientation or orientations of the at least one corresponding handheld client device of the one or more of the one or more users relative to the display on the one or more computer systems is a predetermined orientation or predetermined orientations; and wherein the notification request is a request to the at least one corresponding handheld client device from the one or more users to provide an authenticator from a user for access to the one or more computer system once the calculated distance from the display of the one or more computer systems to the at least one corresponding handheld client device from the one or more of the one or more users is within the first predetermined determined distance and the orientation or orientations of the at least one corresponding handheld client device of the one or more of the one or more users relative to the display of the one or more computer systems is the predetermined orientation or predetermined orientations, and once the user has been authenticated, the user has access to the one or more computer systems.

2. The method according to claim 1, further comprising: receiving, on the processing device, the location data from the at least one corresponding handheld client device from the one or more of the one or more users when the at least one corresponding handheld client device of the one or more of the one or more users is within a second predetermined distance of the one or more computer systems.

3. The method according to claim 1, wherein the one or more users includes a plurality of users, further comprising:

identifying, by the processing device, the user from the plurality of users based on the calculated distance from the one or more computer systems to the at least one corresponding handheld client device of the one or more of the one or more users and the orientation or orientations of the at least one corresponding handheld client device of the one or more of the one or more users relative to the one or more computer systems; and sending, by the processing device, the notification request to the at least one corresponding handheld client device of the one or more of the one or more users of the identified user of the plurality of users for the authenticator.

4. The method according to claim 1, wherein the one or more computers systems including a plurality of computer systems, further comprising:

identifying, by the processing device, one of the one or more users from a plurality of users based on the calculated distance from the plurality of computer systems to the at least one corresponding handheld client device of the one or more of the one or more users and the orientation or orientations of the at least one corresponding handheld client device of the one or more of the one or more users relative to the one or more computer systems; and sending, by the processing device, the notification request to the at least one corresponding handheld client device of the one or more of the one or more users.

5. The method according to claim 1, wherein the at least one corresponding handheld client device is a smartphone, and the request is for the user to enter a password or passcode or biometric identifier on the smartphone.

6. The method according to claim 1, further comprising: assigning, by the processing device, an index score to each of the one or more users for the one or more computer systems, the index score corresponding to a historical use of the one more computer systems by the one or more users; and

sending, by the processing device, the notification request to the at least one corresponding handheld client device from the one or more of the one more users when the index score is above a predetermined threshold value.

7. The method according to claim 6, further comprising: updating, by processing device, the index score for each of the one or more users based on login information into the one or more computer systems by the one or more users.

8. The method according to claim 6, comprising: assigning a default index score to the one or more users, the default score index reflecting a likelihood that the one or more users will access the one or more computer systems.

9. The method according to claim 1, further comprising: receiving, by a processing device of the one or more computer systems, the authenticator including a first authenticator and a second authenticator from the at least one corresponding handheld client device of the one or more of the one or more users receiving the notification request from the processing device, the second authenticator being a biometric identifier; and granting, by the processing device of the one or more computer systems, access to the one or more users receiving the notification request to the one or more computer systems when the at least the first authenticator and the second authenticator match a stored authenticator and a stored biometric identifier for the one or more users.

10. The method according to claim 9, comprising: receiving, by the processing device of the one or more computers systems, the biometric identifier from a biometric authentication device, the biometric authentication device including one or more of a sensor, a scanning device, or an electronic reader; and the biometric identifier is at least one physiological characteristic of the one or more users, and wherein the at least one physiological characteristic is selected from one or more of fingerprints, palm veins, face recognition, DNA (deoxyribonucleic acid), palm print, hand geometry, iris recognition, retina, and/or odor/scent.

11. The method according to claim 9, wherein the first authenticator is received from one or more of a keypad for a username and password, a sensor, scanning device, or an electronic reader, which can read and/or obtain data from one or more of a proximity cards, a radio-frequency identification card, smart cards, and RSA® tokens.

12. The method according to claim 9, wherein the access to the one or more computer system comprises one or more of accessing a home or office, accessing a personal computer, a multi-function printer, or a host device, and accessing a database on the at least one corresponding handheld client device or the host device.

13. A computer program product for authenticating users, the computer program product comprising:

a non-transitory computer-readable storage medium having program instructions embodied therewith, the program instructions executable by a computer to cause the computer to perform a method, comprising:

registering one or more users in an authentication system, each of the one or more users having at least one corresponding handheld client device;

receiving location data from the at least one corresponding handheld client device from one or more of the one or more users;

receiving location data from one or more computer systems;

calculating a distance from the one or more computer systems to the at least one corresponding handheld client device from the one or more of the one or more users based on the location data from the at least one corresponding handheld client device from the one or more users and the location data from a display on the one or more computer systems;

receiving an orientation or orientations of the at least one corresponding handheld client device of the one or more of the one or more users relative to the one or more computer systems;

determining the orientation or orientations of the at least one corresponding handheld client device from the one or more of the one or more users relative to a display on the one or more computer systems;

sending a notification request to the at least one corresponding handheld client device from the one or more of the one more users only when the calculated distance from the one or more computer systems to the at least one corresponding handheld client device from the display on the one or more of the one or more users is within a first predetermined determined distance and when the orientation or orientations of the at least one corresponding handheld client device of the one or more of the one or more users relative to the display on the one or more computer systems is a predetermined orientation or predetermined orientations; and wherein the notification request is a request to the at least one corresponding handheld client device from the one or more users to provide an authenticator from a user for access to the one or more computer system once the calculated distance from the display of the one or more computer systems to the at least one corresponding handheld client device from the one or more of the one or more users is within the first predetermined determined distance and the orientation or orientations of the at least one corresponding handheld client device of the one or more of the one or more users relative to the display of the one or more computer systems is the predetermined orientation or predetermined orientations, and once the user has been authenticated, the user has access to the one or more computer systems.

14. The computer program product according to claim 13, further comprising:

receiving the location data from the at least one corresponding handheld client device from the one or more of the one or more users when the at least one corresponding handheld client device of the one or more of the one or more users is within a second predetermined distance of the one or more computer systems.

15. The computer program product according to claim 13, wherein the one or more users includes a plurality of users, further comprising:

identifying the user from the plurality of users based on the calculated distance from the one or more computer systems to the at least one corresponding handheld client device of the one or more of the one or more users and the orientation or orientations of the at least one corresponding handheld client device of the one or more of the one or more users relative to the one or more computer systems; and sending the notification request to the at least one corresponding handheld client device of the one or more of the one or more users of the identified user of the plurality of users.

16. The computer program product according to claim 13, wherein the one or more computers systems including a plurality of computer systems, further comprising:

identifying one of the one or more users from a plurality of users based on the calculated distance from the plurality of computer systems to the at least one corresponding handheld client device of the one or more of the one or more users and the orientation or orientations of the at least one corresponding handheld client device of the one or more of the one or more users relative to the one or more computer systems; and sending the notification request to the at least one corresponding handheld client device of the one or more of the one or more users.

17. An authentication system configured to authentication users on a computer system, the authentication system comprising:

a server having a processor configured to:

receive location data from at least one corresponding handheld client device, the at least one corresponding handheld client device being registered to a user in an authentication system;

receive location data from one or more computer systems;

calculate a distance from the one or more computer systems to the at least one corresponding handheld client device of the user based on the location data from the at least one corresponding handheld client device from user and the location data from a display on the one or more computer systems;

receive an orientation or orientations of the at least one corresponding handheld client device of the user relative to the one or more computer systems;

determine the orientation or orientations of the at least one corresponding handheld client device from the one or more of the one or more users relative to the display on the one or more computer systems;

send a notification request to the at least one corresponding handheld client device of the user only when the calculated distance from the display on the one or more computer systems to the at least one corresponding handheld client device of the user is within a first predetermined determined distance and when the orientation or orientations of the at least one corresponding handheld client device of the user relative to the display on the one or more computer systems is a predetermined orientation or predetermined orientations; and wherein the notification request is a request to the at least one corresponding handheld client device from the one or more users to provide an authenticator from the user for access to the one or more computer system once the calculated distance from the display of the one or more computer systems to the at least one corresponding handheld client device from the one or more of the one or more users is within the first predetermined determined distance and the orientation or orientations of the at least one corresponding handheld client device of the one or more of the one or more users relative to the display of the one or more computer systems is the predetermined orientation or predetermined orientations, and once the user has been authenticated, the user has access to the one or more computer systems.

18. The system according to claim 17, wherein the processor is further configured to:

receive the location data from the at least one corresponding handheld client device of the user when the at least one corresponding handheld client device of the user is within a second predetermined distance of the one or more computer systems.

19. The system according to claim 17, wherein the user includes a plurality of users, and the processor is further configured to:

identify the user from the plurality of users based on the calculated distance from the one or more computer systems to the at least one corresponding handheld client device of the user and the orientation or orientations of the at least one corresponding handheld client device of the user relative to the one or more computer systems; and send the notification request to the at least one corresponding handheld client device of the identified user of the plurality of users.

\* \* \* \* \*